United States Patent

[11] 3,537,424

[72] Inventor Robert L. Sadler
 Kansas City, Missouri
[21] Appl. No. 703,596
[22] Filed Feb. 7, 1968
[45] Patented Nov. 3, 1970
[73] Assignee The United States of America
 as represented by the United States Atomic
 Energy Commission

[54] RESIN IMPREGNATION OF CELLULAR MEMBERS
 4 Claims, 4 Drawing Figs.
[52] U.S. Cl.................................................... 118/6,
 118/52, 118/320, 118/326
[51] Int. Cl..................................................... B05c 5/00,
 B05c 11/16
[50] Field of Search.......................................... 118/6,
 52, 55, 56, 320, 326, 73/(Inquired); 250/(Inquired);
 324/(Inquired)

[56] References Cited
UNITED STATES PATENTS

| 442,628 | 12/1890 | Kristen........................ | 118/52 |
| 1,686,313 | 10/1928 | Dreher et al.................. | 118/52 |
| 3,112,633 | 12/1963 | Wilkinson.................... | 118/52X |

Primary Examiner—John P. McIntosh
Attorney—Roland A. Anderson

ABSTRACT: The resin impregnation of generally annular structures to achieve enhanced strengths or densities which comprises rotatably supporting the structure that is to be impregnated and applying resin thereto during an initial relatively slow rotation so that the resin may permeate wall portions of the structure, and thereafter increasing the speed of rotation of the structure to throw off resin while simultaneously monitoring the resin permeated structure, terminating rotation when throw off of resin has reduced resin permeation to a predetermined value, and subsequently curing the resin impregnated structure.

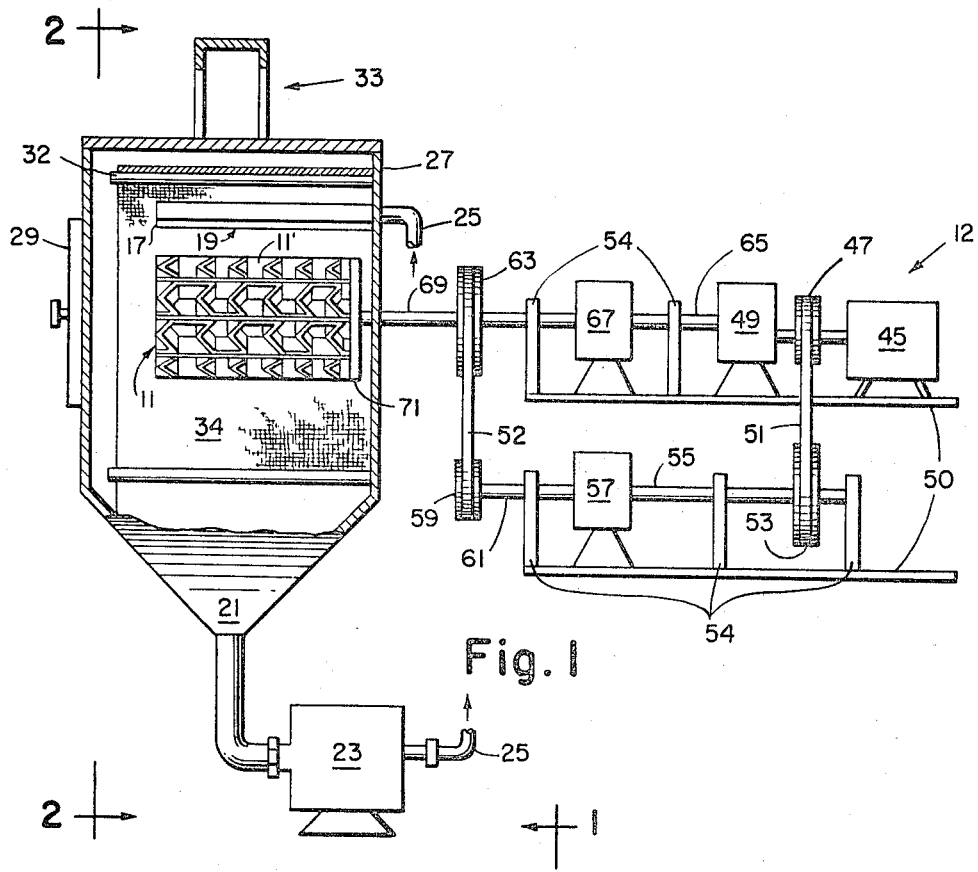
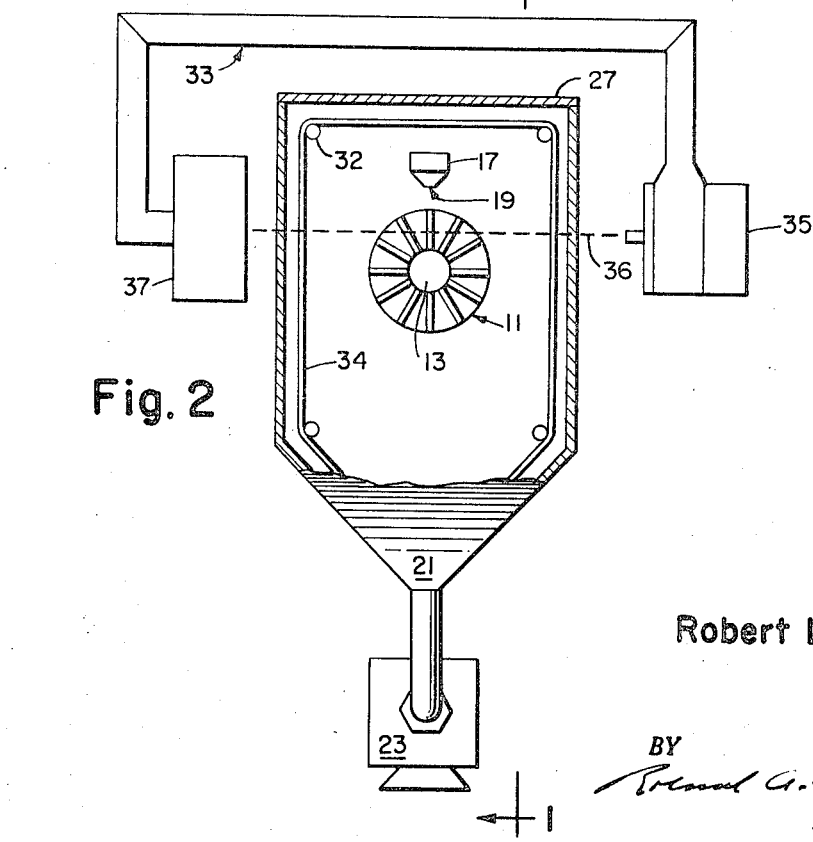

Robert L. Sadler
INVENTOR.

BY

RESIN IMPREGNATION OF CELLULAR MEMBERS

BACKGROUND OF INVENTION

Strong and light weight insulation or structural members for such applications as aircraft, missile or rocketry may be manufactured by resin impregnation of paper, cloth or other inexpensive, normally low strength materials which have been shaped to form "honeycomb" or other cellular structures. For example, in a missile it may be desired to support a liquified gas or fuel tank within and spaced from an outer cylindrical rocket shell by an intermediate appropriately configured "honeycomb" insulative member; such member may be of light weight paper, cloth, fibrous glass, etc., which in unimpregnated state is light weight but lacks strength. Strength of the member may be greatly increased by immersing the member in a tank of liquid synthetic resin material and then permitting a portion of liquid resin to drain away until, hopefully, a quantity remains to provide desired strength or density and insulation qualities subsequent to curing. The latter procedure is slow and subject to shortcomings in that optimum impregnation for strength, weight, density, insulation, etc., are not readily and accurately controllable. Uses in addition to those already stated may be for containers, packing forms, and supports for shipping delicate instruments.

In previous attempts at impregnation of materials the absence of close circuit control over the operation has resulted in waste of time and resin as well as imperfectly impregnated members. Furthermore, with no satisfactory in-process means for measuring the extent of resin impregnation of the member, quality control standards could not readily be maintained during operations to provide consistently impregnated products.

SUMMARY OF INVENTION

Therefore it is an object of this invention to provide an apparatus and method for rapid and accurate resin impregnation of a cellular or honeycomblike member to a desired degree.

It is a further object to provide an apparatus and method for resin impregnation of a member which permits in-process monitoring and control of impregnation.

Various other objects and advantages will appear from the following description of one embodiment of the invention.

As shown the apparatus for controlled resin impregnation of a "honeycomb" member comprises multispeed means for rotating said member, a resin distribution system for saturating or filling cells of the member while it is rotating at an initial or slow velocity, a radiation device for sensing the quantity of resin impregnation within said member during rotation thereof at one or more of said speeds during which excess resin is thrown off, and control means communicating with the radiation device for terminating rotation when the desired impregnation or density is reached, and a method for operating the apparatus.

DESCRIPTION OF DRAWINGS

One embodiment of the invention is disclosed in the accompanying drawing wherein:

FIG. 1 is an elevation view partly in cross section of a resin impregnation apparatus;

FIG. 2 is a cross-sectional view taken along the line 2–2 of FIG. 1;

DETAILED DESCRIPTION

Figure 3:
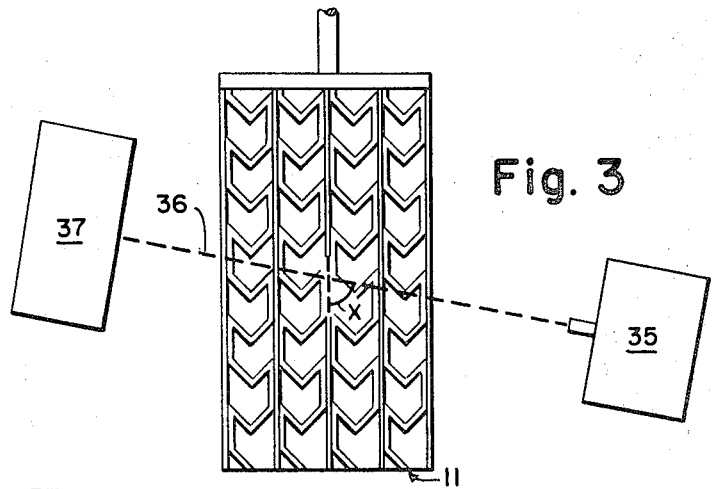
FIG. 3 is a diagrammatic view illustrating a preferred relationship of radiation device or X-ray transmitter, detector, and cellular member of FIGS. 1 and 2.

Referring more particularly to FIGS. 1 and 2 where apparatus for resin impregnation of a cellular member 11 is disclosed, the member 11 is shown mounted on a rotatable spool or mandrel 13 coupled to a multispeed rotary drive 12. A resin distribution conduit, trough or spray head 17 is disposed adjacent the mandrel for dispensing liquid resin materials onto a member 11. A housing 27 encloses the member mounted on the mandrel and the adjacent resin distribution conduit or trough. Liquid resin materials or components may be supplied to the apertured distribution trough or conduit 17 via pipe 25 from resin reservoir 21 or suitable supply tanks (not shown).

The cellular member or honeycomb 11 may be of cylindrical configuration with open ended cells or cavities 11 as shown in the drawings so that liquid resin materials may be readily delivered into the cells through their open ends to soak into or permeate the walls thereof. Any other member and cell shapes and configurations appropriate to desired strength and requirements may be selected which provide open ended cavities or indentations into which resin may be supplied for impregnation. The honeycomb or cell structure of member 11 may be performed from paper, cloth, etc., and fitted around the mandrel 13, which may be attached in turn to a support plate 71 coupled to drive output shaft 69.

As shown, the drive 12 may comprise a motor 45 which may drive both a gearbox speed reducer 49 and a sheave or sprocket 47. The sheave or sprocket 47 may be linked by suitable belts or chains 51 to a second sheave or sprocket 53 which may be mounted on a common shaft 55 with a suitable electrically actuable clutch 57. A third sheave or sprocket 59 may be fixed to the output shaft 61 of clutch 57 and may be linked to a fourth sheave or sprocket 63 by belts or chains 52. The fourth sheave 63 may be mounted on the output shaft 69. The size and arrangement of these four sheaves 47, 53, 59, and 63 in conjunction with the output speed of motor 45 may determine one of the two output velocities of the multiple or dual speed drive.

Output shaft 69 may be driven at another slower velocity through gearbox 49. The gearbox output shaft 65 may be coupled to a second electrically actuable clutch 67 which when engaged rotates shaft 69 at a speed determined by the ratio of gearbox 49 and the rotational rate of motor 45.

Clutches 57 and 67 may be controlled such that only one of the two is engaged at any one time. During resin application, a first relatively slow speed may be provided through engagement of clutch 67 which selects gearbox 49 as the speed reducer. When it is desirable to spin or throw off excess resin from the cellular member of centrifugal force a second and greater velocity may be obtained by engaging clutch 57 which transmits power from the drive motor by way of the four sheaves 47, 53, 59 and 63.

The drive 12 may rest on platforms 50 which may be rigidly held together and supported by suitable structural members (not shown). If required, suitable bearing supports 54 may secure the shafts in place between the individual pieces of transmission equipment. Furthermore, other multispeed drive arrangements may function satisfactorily in conjunction with the present invention, such as a drive including a plurality of motors or a variable speed motor or motors.

Cellular or honeycomb member 11 may be slowly rotated at a first speed beneath or adjacent the resin supplying distribution conduit or trough 17. The liquid resin may gravitate or spray onto the cellular member and into individual cells 11' thereof to fill or substantially fill them, through a slot or holes 19 of trough or conduit 17. If desired, conduit 17 may be pressurized and equipped with spray nozzles directed towards member 11. As the liquid resin is distributed onto and fills the cells 11', during initial slow rotation of the honeycomb member 11, it permeates into pores or interstices of the paper, cloth, or the like which forms the cell walls.

As cellular member 11 rotates additional cells are presented to the distribution trough for filling and previously filled cells are tilted for dumping out excess resin. The member 11 may be rotated one or more times at slow rotation to ensure sufficient or substantially complete impregnation of cell walls throughout the circumference of member 11. On initiating increased rotational velocity, further excess resin may be thrown from the member into housing 27 and resin reservoir 21 which may be an integral part of housing 27 disposed below the cellular member 11. Resin accumulated in reservoir 21 may be recirculated to trough 17 by way of pipe 25 and pump 23 during resin application. Resin splatter on housing 27 walls may be minimized by installing a disposable paper, cloth, plastic, etc. liner 34 intermediate the cellular member 11 and the housing. Liner 34 may be supported as shown by hanger rods 32 or other like means and attached to the lower portion of the housing 27 or reservoir 21 by taping the free ends or by suitable fasteners (not shown). Access to the liner 34 and member 11 may be provided by a suitably latched door 29 which may include an inspection window (not shown).

The monitoring radiation may comprise X-rays furnished by an X-ray source or transmitter 35 mounted on a carriage assembly 33 which disposes an X-ray receiver or detector 37 spaced from the source and at an opposite side of housing 27 and cellular member 11. The X-ray device and its components or accessories may be any suitable commercially available type, e.g., those of the density-times-thickness variety.

In FIG. 2 and FIG. 3 the means for sensing the quantity or density of resin impregnation of the member 11 is shown as an X-ray beam 36 oriented so as to pass through a substantial portion of cellular member 11, the X-ray beam 36 being preferably off the rotational or radial center of the cellular member 11 so as to avoid passing through the mandrel 13 itself, which may be composed of a metal or other material of density greater or different than that of the resin filled member. To assist in averaging portions of the honeycomb or cell materials, as well as possible inconsistencies in amounts of resin impregnation which may exist between layers of impregnated cells, the X-ray beam 36 may be angularly disposed to the longitudinal axis or axis of rotation of the cellular member 11. The plan view projection of the angle therebetween designated as X in FIG. 3 may be about 80°, but this is merely illustrative as any other appropriate angles may be utilized.

Figure 4:
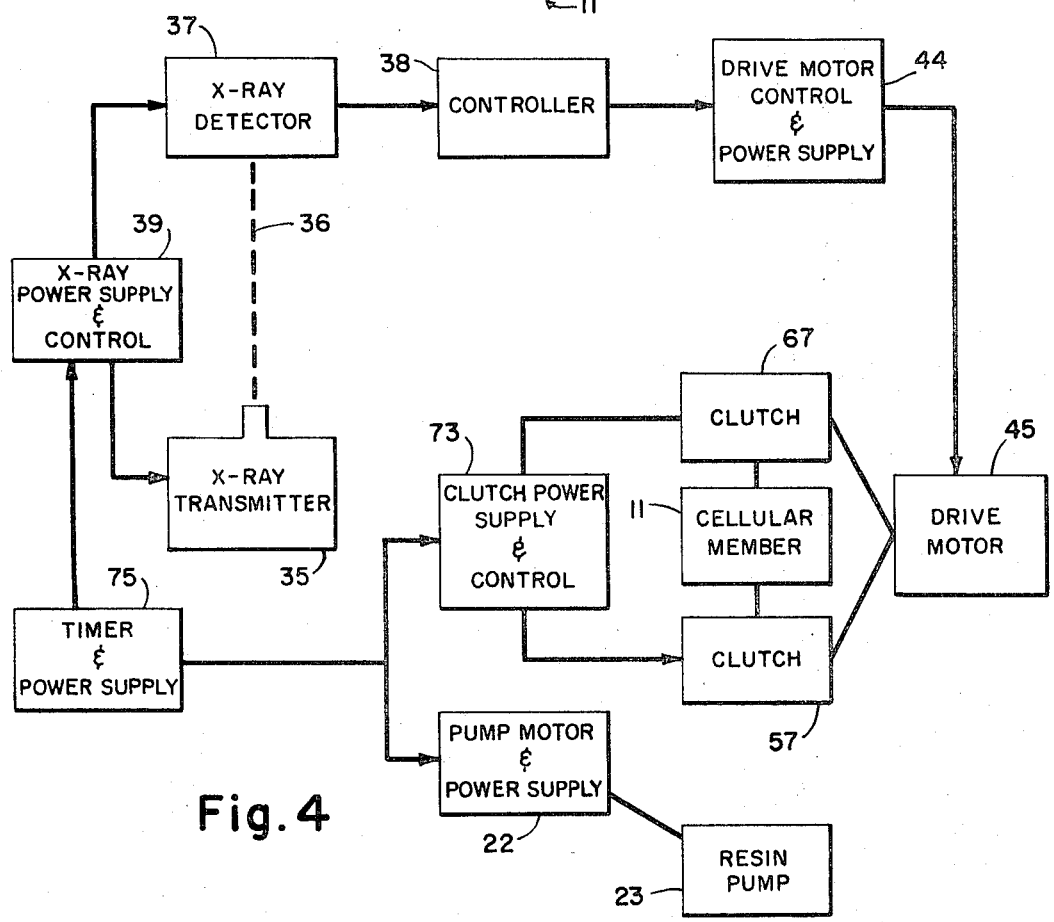
FIG. 4 is a schematic diagram illustrating controlling components and arrangement which may be used with the apparatus.

A control system which may be used in conjunction with the invention is illustrated more particularly in FIG. 4. Timer 75 may be selectively set for the period of time during which resin may be applied to the rotating cellular member 11. Initiation of timer 75 may start pump motor 22 which drives resin pump 23 so that resin may be provided to the distribution trough 17 (FIG. 1) adjacent the cellular member 11. Simultaneously, the drive motor 45 may be energized and clutch control 73 signaled to engage clutch 67 which may cause cellular member 11 to be rotated at a first or initial relatively slow velocity. The cellular member may rotate at this first velocity while resin is being applied for at least one full revolution so that all cells within the member may be exposed to the resin flow from trough 17 and be resin filled to excess. When its interval expires, timer 75 may deenergize pump motor 22 to terminate the resin flow, signal clutch control 73 to engage clutch 57 and thus cause cellular member 11 to be rotated at a second, increased velocity, and energize the X-ray transmitter 35 and detector 37 through the X-ray power supply and control 39 such that an X-ray beam 36 may be produced.

The intensity of X-ray beam 36 may be diminished as it passes through cellular member 11 and accordingly the X-ray beam intensity reaching detector 37 may be representative of the degree of impregnation or density of cellular member 11. Density controller or comparator 38 which may compare the "observed" density with a desired density, and may for example, comprise an electronic relay having an adjustable potentiometer at its input for varying the controller set point to different predetermined densities. The predetermined or desired density may be set into controller 38 through X-ray scrutiny of similar members prior to and after the desired amount of resin impregnation. Also suitable simulated standards may be prepared from such as plexiglass and permanently retained to set controller 38 to the predetermined amount of resin impregnation. When sufficient resin has been spun or thrown off from the cellular member such that its degree of resin impregnation substantially equals that desired, controller 38 may signal the drive motor control 44 to deenergize drive motor 45, thus terminating rotation of the cellular member. If desired, a signal device such as a bell or light (not shown) may be activated to announce completion of the impregnation process such that the process for curing the member may proceed.

As an alternate mode of operation, the X-ray means may be activated simultaneously with the drive motor 45, resin pump 23, and clutch 67. When sufficient resin has been applied to the member 11, the density controller 38 may deenergize both the drive motor and the resin pump. This method is not preferred as the resin must be applied and X-ray scrutiny made at a relatively slow rotational velocity such that localized high density may trigger the control circuitry.

While an X-ray generator or transmitter has been particularly referred to in connection with sensing and monitoring, it will be clear that any other suitable radiation supplying means may be utilized, for example, gamma rays from a gamma radiation source such as cobalt 60, strontium 90, or a beta radiation source etc.

EXAMPLE 1

A 12-inch diameter by 14-inches long cylindrical cotton linter paper cellular member or honeycomb having a density of about 4-pounds per cubic foot was rotated at an initial rate of about one-half r.p.m. for 2 minutes while 9,000 grams of epoxy resin mixed with 3,780 grams of curing agent was applied. The resin comprised the triglycidyl derivation of p-aminophenol, and the curing agent the liquid eutectic mixture of metaphenyldiamine and and methylene diamine. Thereafter the cellular member was rotated at an increased velocity of about 150 r.p.m. to spin off excess resin until an impregnated density of about 8-pounds per cubic foot was reached. The honeycomb or cellular member was then removed from the housing and placed within a curing oven heated to 180°F. where the member was rotated at about one-half r.p.m. for 2 hours and then baked for an additional 3 hours to complete curing.

EXAMPLE 2

A cellular member having generally V-shaped cells formed from 140 pound basis weight cotton linter paper was initially rotated at about one-half r.p.m. for 4 minutes while the cells where filled with about 9,000 grams of the resin, the diglycidyl ether of bisphenol–A, mixed with 1,980 grams of the curing agent menthane diamine. Excess resin was thereafter centrifuged from the cellular member by increasing the velocity to about 200 r.p.m. until the desired density was obtained. Then the member was removed for heat curing in a separate oven for 2 hours at about 260°F. while being rotated and followed by additional cure of 12 hours at about 290°F.

The invention provides an apparatus and procedure for quick and accurate resin impregnation of a cellular member to a predetermined degree in a minimum time with minimum resin waste, and a method of decreasing the density of a cellular, resin impregnated member by spinning off excess impregnant at one rotational velocity after applying resin at a slower velocity. Furthermore, a method of sensing density of resin impregnated member through use of radiation device is provided which allows accurate control of the member's finished density.

It will be understood that various changes in the details, materials, and arrangements of the parts may be made by those skilled in the art consistent with the invention as expressed in the appended claims.

I claim:

1. Apparatus for resin impregnation of a cellular member to a predetermined density comprising, a support for a said member, resin distribution means adjacent said support for applying resin to a member thereon, means for rotating the support at an initial rate during resin distribution to the member and at a subsequent greater rate for throwing off resin, radiation supplying means adjacent said support having transmitting and receiving portions spaced from each other and at oppositely disposed surfaces of a member on said support for providing a monitoring beam through the member, and control means responsive to said radiation supplying means for terminating said subsequent greater rotation rate when said predetermined density is obtained.

2. The apparatus according to claim 1 wherein said radiation supplying means comprises an X-ray transmitter, X-ray receiver, and means for comparing the X-ray beam intensity with a predetermined value representative of a predetermined density.

3. The apparatus according to claim 2 wherein said X-ray transmitter and receiver are spaced apart and at oppositely disposed surfaces of a member on said rotatable support for providing an X-ray beam through a substantial portion of said member at an angle of about 80° to the axis of rotation thereof.

4. The apparatus according to claim 1 wherein there is provided a housing enclosing said support and resin distribution means, and means for supporting a disposable liner intermediate said housing and cellular member to receive resin thrown off a rotating member.